(12) United States Patent
Hendriks et al.

(10) Patent No.: US 7,385,755 B2
(45) Date of Patent: Jun. 10, 2008

(54) ADJUSTABLE MIRROR

(75) Inventors: Bernardus Hendrikus Wilhelmus Hendriks, Eindhoven (NL); Stein Kuiper, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 10/556,246

(22) PCT Filed: May 10, 2004

(86) PCT No.: PCT/IB2004/050619

§ 371 (c)(1),
(2), (4) Date: Nov. 10, 2005

(87) PCT Pub. No.: WO2004/002257

PCT Pub. Date: Nov. 25, 2004

(65) Prior Publication Data

US 2006/0262433 A1    Nov. 23, 2006

(30) Foreign Application Priority Data

May 14, 2003   (EP) ................... 03101336

(51) Int. Cl.
  *G02B 1/06*   (2006.01)
  *G02B 3/12*   (2006.01)
(52) U.S. Cl. ..................... 359/365; 359/366
(58) Field of Classification Search ................ 359/846
See application file for complete search history.

(56) References Cited

U.S. PATENT DOCUMENTS

| | | | |
|---|---|---|---|
| 4,289,379 A | 9/1981 | Michelet | |
| 4,583,824 A * | 4/1986 | Lea | 359/223 |
| 4,890,903 A | 1/1990 | Treisman et al. | |
| 4,951,285 A | 8/1990 | Cole et al. | |
| 5,825,801 A * | 10/1998 | Nishida et al. | 372/99 |
| 5,880,896 A | 3/1999 | Ishii et al. | |
| 6,002,661 A | 12/1999 | Abe et al. | |
| 6,302,542 B1 | 10/2001 | Tsao | |
| 6,369,954 B1 * | 4/2002 | Berge et al. | 359/666 |
| 6,449,081 B1 * | 9/2002 | Onuki et al. | 359/245 |
| 6,961,167 B2 * | 11/2005 | Prins et al. | 359/253 |
| 2003/0012483 A1 * | 1/2003 | Ticknor et al. | 385/16 |

FOREIGN PATENT DOCUMENTS

| | | |
|---|---|---|
| DE | 19710668 A1 | 9/1998 |
| EP | 1069450 A2 | 1/2001 |
| EP | 1069450 A2 | 10/2001 |
| JP | 11072605 A | 3/1999 |

(Continued)

OTHER PUBLICATIONS

C. Pare et al. IEEE J. Quantum Electron. 28 (1994) p. 355, J. Leger et al. Opt. Lett. 19 (9994) p. 108. J. Leger et al Opt. Lett. 19 (1994) p. 1976.

(Continued)

*Primary Examiner*—Joshua L Pritchett

(57) ABSTRACT

An adjustable mirror includes first and second fluids in contact over a meniscus extending transverse an optical axis. The fluids are substantially immiscible and have different indices of refraction. A reflective surface extends transverse the optical axis. A meniscus adjuster is arranged to controllably alter at least one of the shape and the position of the meniscus.

17 Claims, 12 Drawing Sheets

FOREIGN PATENT DOCUMENTS

| | | | |
|---|---|---|---|
| JP | 2001318326 A | 11/2001 | |
| WO | 9918456 | 4/1999 | |
| WO | 02069016 A2 | 9/2002 | |
| WO | 02066527 | 12/2002 | |

OTHER PUBLICATIONS

S. Makki et al, IEEE J. Electron 35 (1999) p. 1075.

"Laser beams & resonators" H. Kogelnik & T. Li appl. Opt 5 (1996) pp. 1550-1567 & also in the book "Laser", A.E. Siegman, University Science Books.

Mill Valley, California chapter 19.

C. Pare et al; "Custom Laser Resonators Using Graded-Phase Mirrors", IEEE Journal of Quantum Electronics, vol. 28, No. 1, Jan. 1992.

James R. Leger et al; "Difractive Optical Element for Mode Shaping of a ND: YAZ Laser", Dept. of Eng. Optics Letters, vol. 19, No. 2, Jan. 16, 1994.

James R. Leger et al; "High Modal Discrimination in a ND: YAG Laser Resnoator Witih Intenal Phase Gratings", Optics Letter, vol. 19, No. 23, Dec. 1, 1994.

H. Kogelnik et al; "Laser Beams and Resonators", Applied Optics, vol. 5, No. 10, Oct. 1966.

Siamak Makki et al; "Solid State Laser Resonators with Diffractive Ooptic Thermal Aberration Correction", IEEE Journal of Quantum Electronics, vol. 35, No. 7, July, 1999.

ISR: PCT/2004/050619.

Written Opinion: PCT/2004/050619.

R. Kingslake; "Lens Design Fundementasl", Institute of Optics, Univ. of Rochester, NY, Academic Press, Inc., pp. 309-311.

* cited by examiner

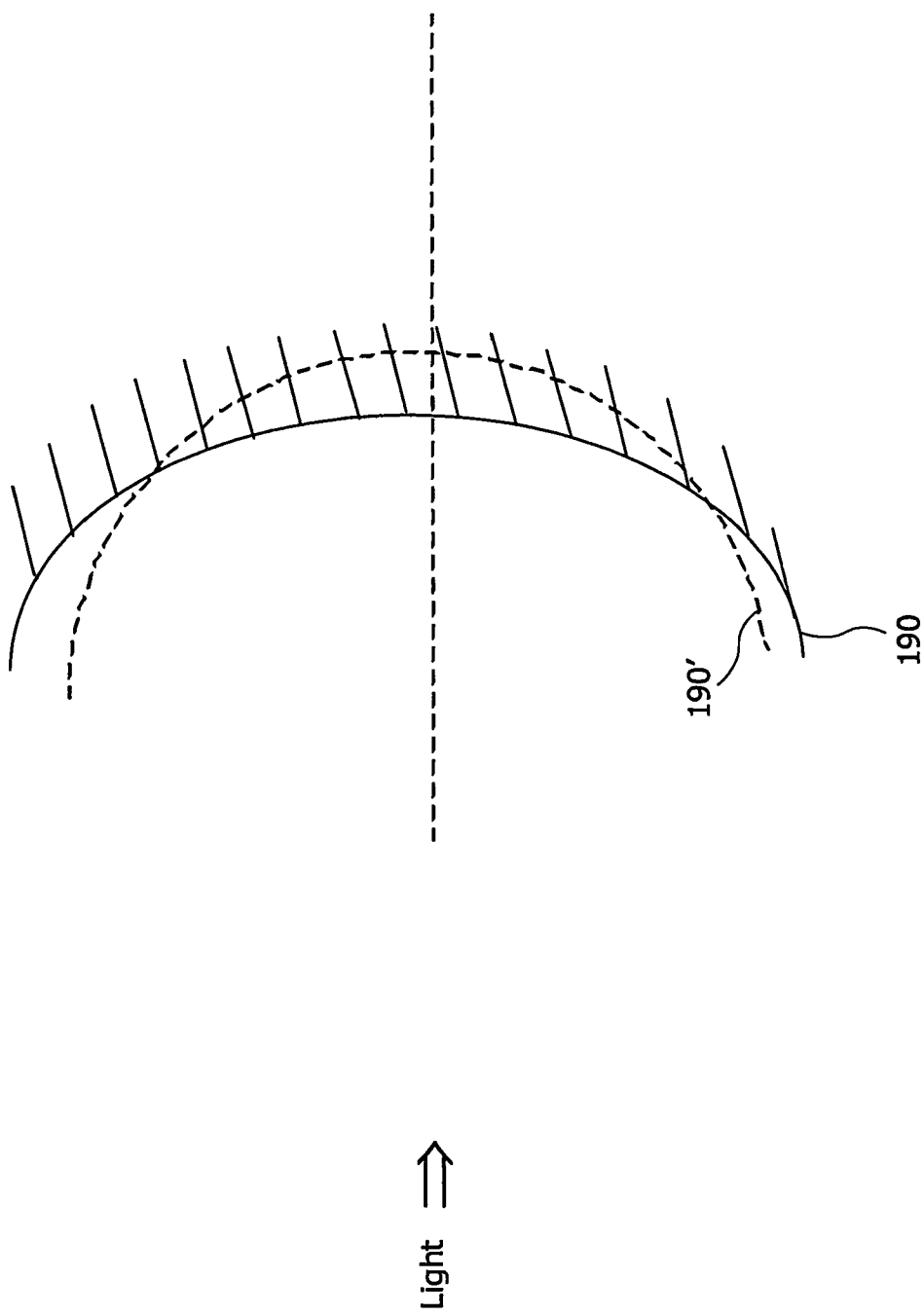

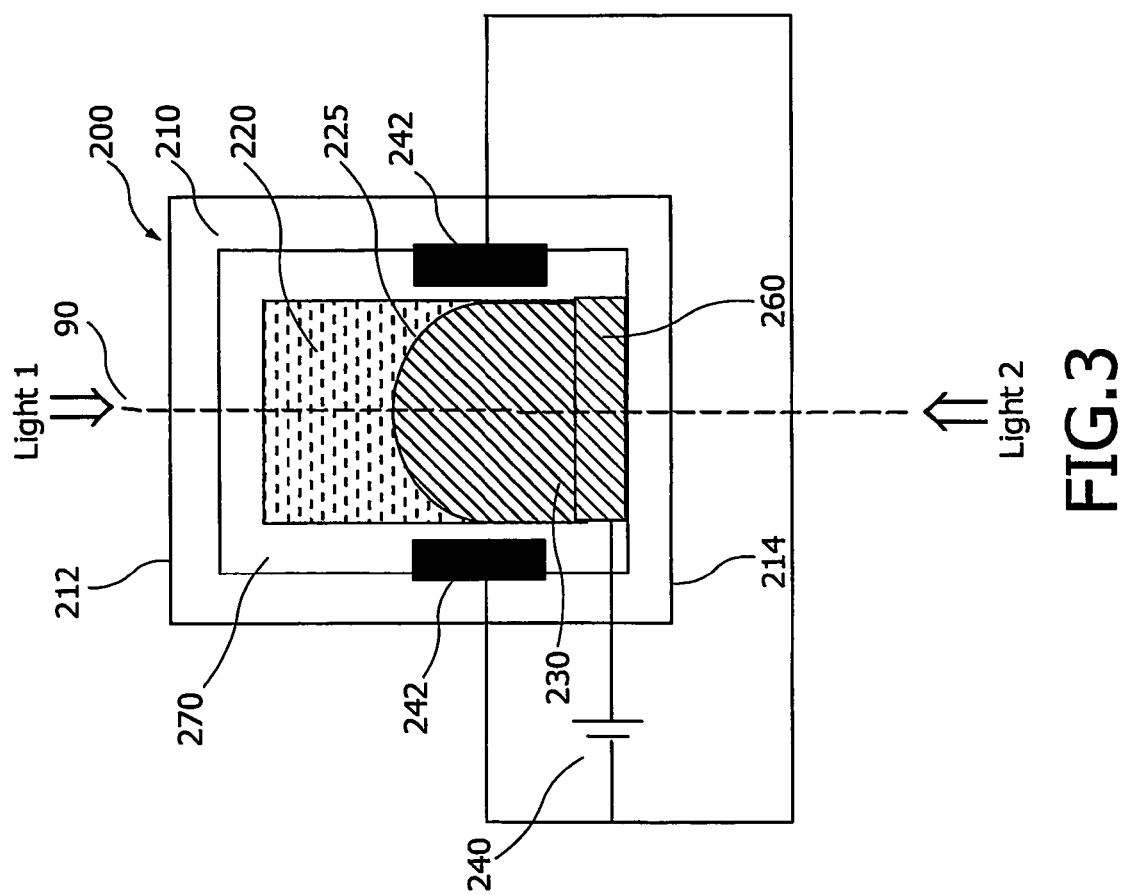

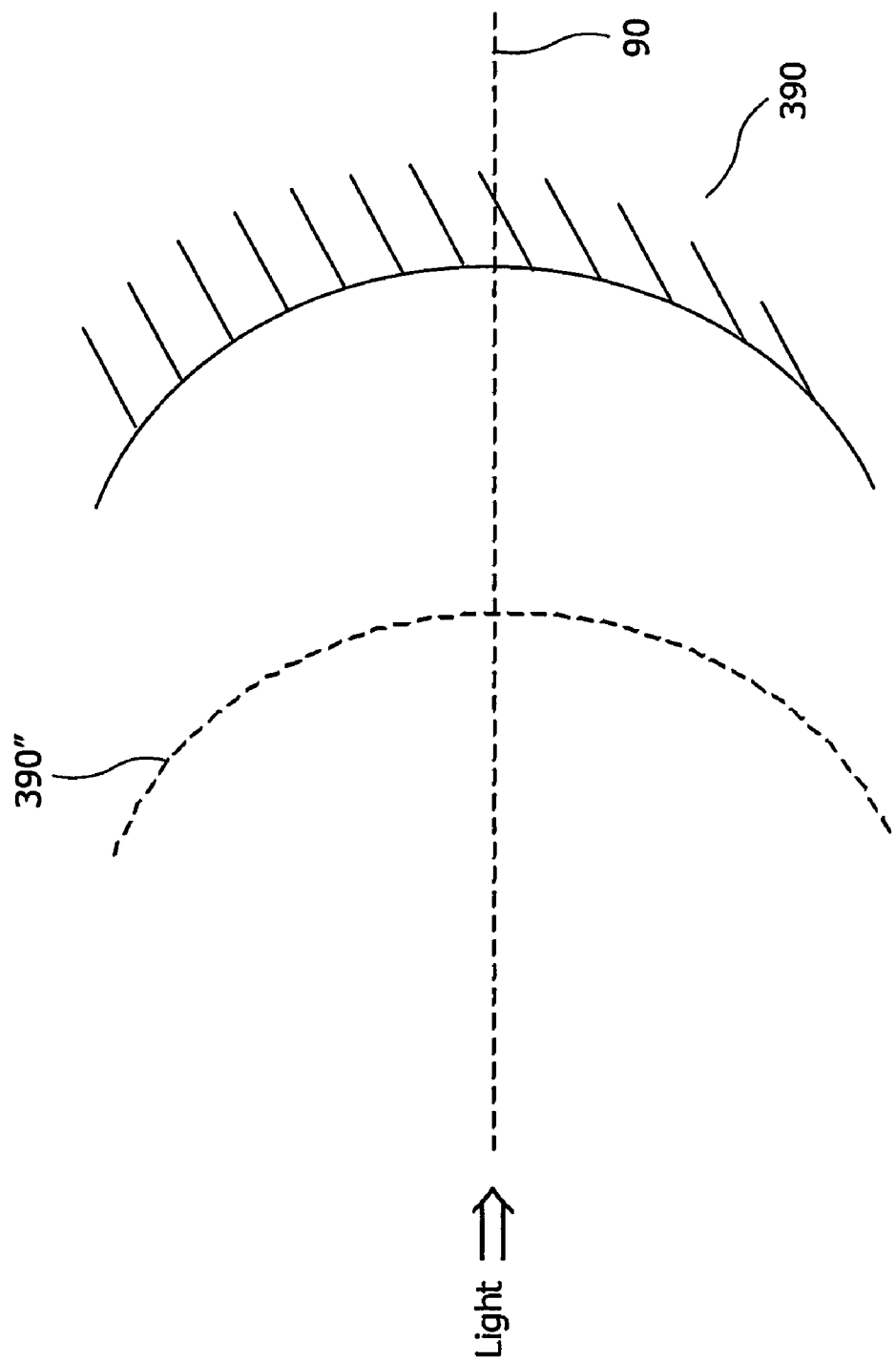

ADJUSTABLE MIRROR

FIELD OF THE INVENTION

The present invention relates to adjustable mirrors, to optical devices including adjustable mirrors, and to methods of manufacturing such mirrors and such devices.

BACKGROUND OF THE INVENTION

A mirror is a device that is arranged to reflect light. The term light is understood to include both visible electromagnetic radiation, and other wavelengths of electromagnetic radiation.

An adjustable mirror is a mirror in which the reflective properties of the mirror can be controllably adjusted. For instance, the shape (or apparent shape) of the reflecting surface may be altered, or the position (or apparent position) of the reflecting surface may be altered.

One type of adjustable mirror is the deformable mirror, in which the reflective surface of the mirror can be controllably deformed so as to provide a desired shape. For instance, the reflective surface of a spherical mirror may be controllably deformed so as to alter the radius of curvature of the mirror. Such deformable mirrors are typically used in reflecting telescopes.

U.S. Pat. No. 5,880,896 describes a deformable mirror for use in an optical disc recording/reproducing apparatus. The mirror is adjusted by controllably deforming a flexible member having a reflective surface, the member being deformed by an electrostatic stress.

Such deformable mirrors are susceptible to wear, as the mirror is continually stressed and de-stressed to obtain the desired shape. Further, deforming the reflective surface in the desired manner is difficult to control, and consequently it is relatively expensive to provide a deformable optical mirror of good optical quality.

DE 19710668 describes an alternative adjustable mirror 10, as illustrated in FIGS. 1A and 1B. The mirror system 10 comprises a membrane 12 filled with a fluid 14. The pressure of the fluid 14 within the membrane 12 is controlled by means of a pump 16. The membrane 12 acts as a variable lens, with the shape (and hence power) of the lens varying in dependence upon the pressure of the fluid 14. FIG. 1A shows the fluid 14 at a low pressure i.e. with the membrane 12 forming a bi-concave lens. FIG. 1*b* shows the fluid 14 at a higher pressure, with the membrane 12 forming a bi-convex lens.

Attached to the central portion 18 of one surface of the membrane 12 is a rigid convex reflective surface 20. The mirror 10 formed by the membrane 12 and the reflecting surface 20 is adjusted by varying the pressure of the fluid 14. Consequently, the power of the lens formed by the membrane 12 is altered, and hence the apparent curvature of the mirror (i.e. the total power of the mirror which is the result of the lens shape created by the membrane 12 and the curved reflective surface 20) is adjusted. The disadvantage of such a system is that, due to the movement of the membrane surface and the reflective surface it is difficult to maintain good optical properties and it is susceptible to vibrations. Further, it is susceptible to mechanical wear.

It is an aim of embodiments of the present invention to provide an adjustable mirror that addresses one or more problems of the prior art, whether referred to herein or otherwise. It is also an aim of the present invention to provide optical devices incorporating such improved adjustable mirrors, and methods of manufacturing such improved adjustable mirrors and such optical devices.

It is an aim of particular embodiments of the present invention to provide an adjustable mirror in which the optical path is relatively unsusceptible to mechanical wear and tear during operation.

STATEMENTS OF THE INVENTION

In a first aspect, the present invention provides an adjustable mirror comprising: a first fluid and a second fluid in contact over a meniscus extending transverse an optical axis, the fluids being substantially immiscible and having different indices of refraction; a reflective surface extending transverse the optical axis; and a meniscus adjuster arranged to controllably alter at least one of the shape and the position of the meniscus.

The interface between the two fluids can act to change the direction of incident radiation e.g. the interface can act as a lens or a beam deflector. By varying the shape or position of this interface, the effective optical properties (i.e. power, apparent position or apparent orientation) of the mirror can be adjusted. As no moving mechanical parts are required within the optical path of such an adjustable mirror, the performance of the mirror is relatively immune to mechanical wear and tear.

In another aspect, the present invention provides an optical device comprising: a first fluid and a second fluid in contact over a meniscus extending transverse an optical axis, the fluids being substantially immiscible and having different indices of refraction; a reflective surface extending transverse the optical axis; and a meniscus adjuster arranged to controllably alter at least one of the shape and the position of the meniscus.

In a further aspect, the present invention provides a method of manufacturing an adjustable mirror, the method comprising the steps of: providing a first fluid and a second fluid in contact over a meniscus extending substantially transverse an optical axis, the fluids being substantially immiscible and having different indices of refraction; providing a reflective surface extending transverse the optical axis; and providing a meniscus adjuster arranged to alter at least one of the shape and the position of the meniscus.

In another aspect, the present invention provides a method of operating an optical device, the optical device comprising: a first fluid and a second fluid in contact over a meniscus extending transverse an optical axis, the fluids being substantially immiscible and having different indices of refraction; a reflective surface extending transverse the optical axis; the method comprising controllably altering at least one of the shape and the position of the meniscus so that the mirror provides the desired reflective properties.

Other aims and advantages of the present invention will be apparent from the preferred features as set out in the accompanying claims.

BRIEF DESCRIPTION OF DRAWINGS

For a better understanding of the invention, and to show how embodiments of the same may be carried into effect, reference will now be made, by way of example, to the accompanying diagrammatic drawings in which:

FIGS. 2A and 2B illustrate respectively a schematic cross section of an adjustable mirror and the equivalent optical function provided by the adjustable mirror in accordance with a first embodiment of the present invention;

FIG. 3 illustrates an electrowetting adjustable lens suitable for use in the adjustable mirror shown in FIG. 2A;

FIGS. 4A and 4B illustrate respectively a schematic cross section of an adjustable mirror and the equivalent optical function provided by the adjustable mirror in accordance with a second embodiment of the present invention;

DETAILED DESCRIPTION OF PREFERRED EMBODIMENTS

Figure 1A:
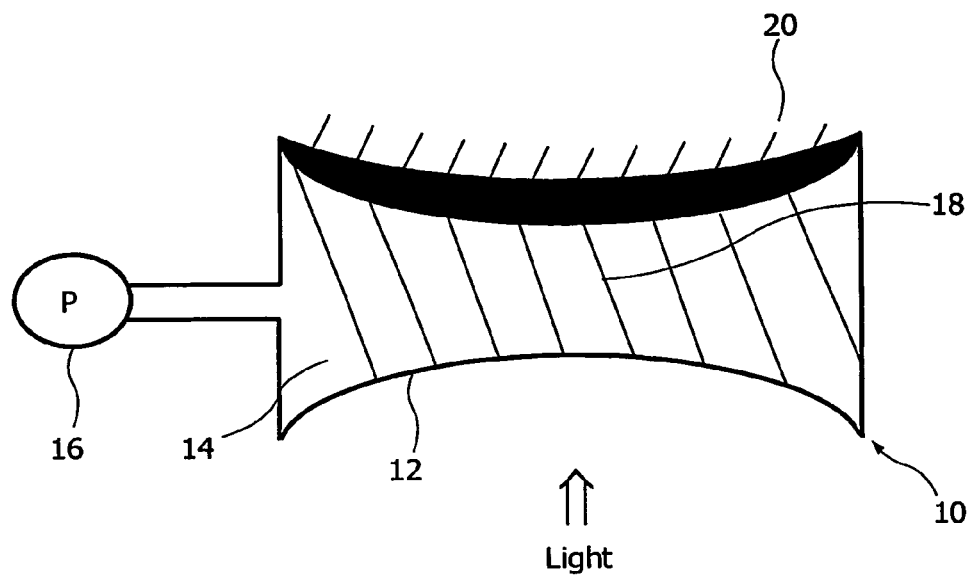
FIGS. 1A and 1B show a known adjustable mirror in schematic cross section in two different configurations.
Figure 1B:
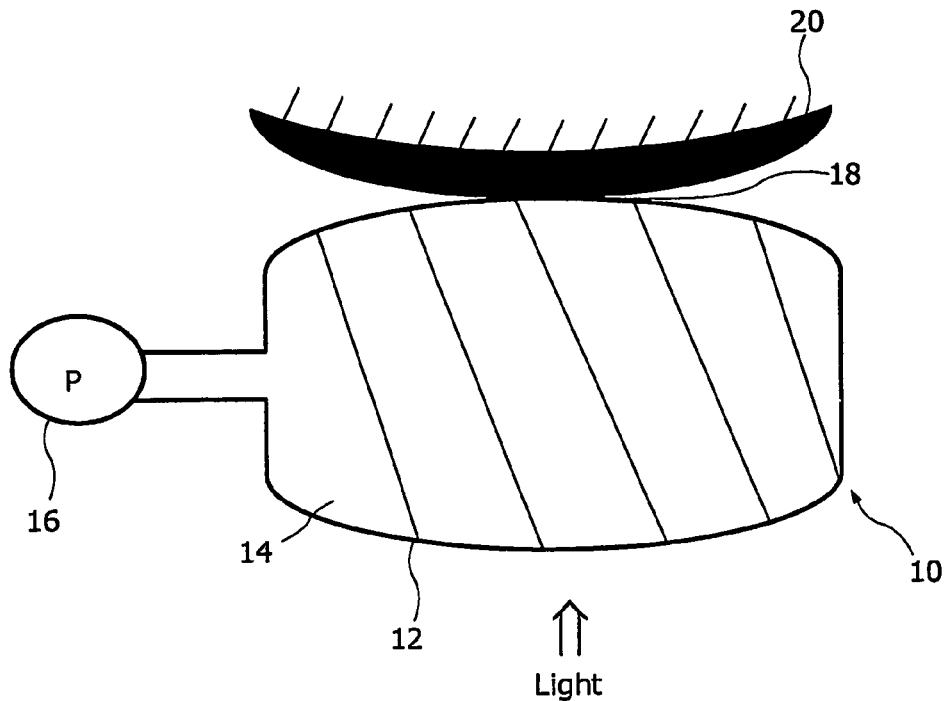
Figure 2A:
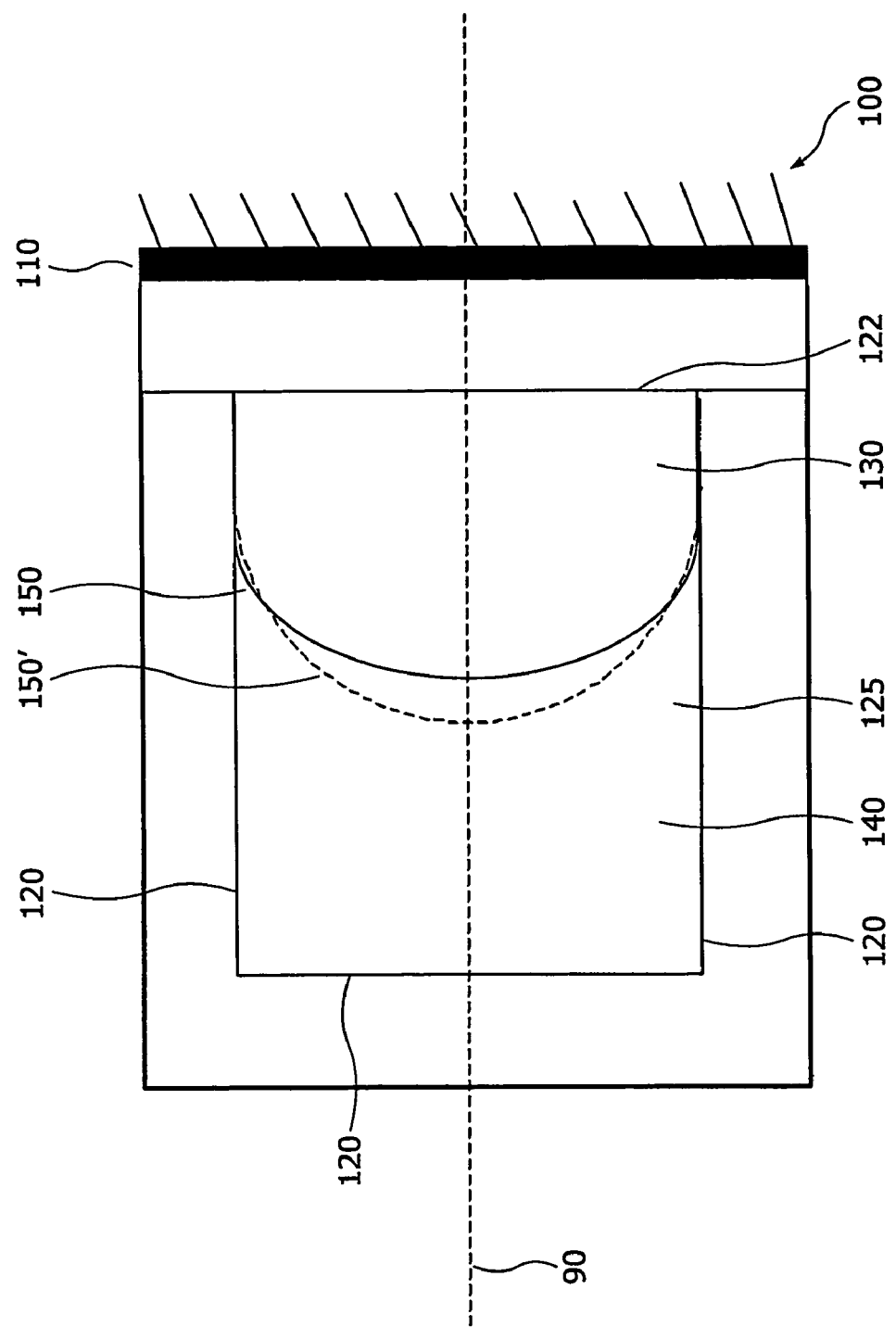

FIG. 2A shows an adjustable mirror 100 in accordance with a first embodiment of the present invention. The mirror 100 can be regarded as being formed of two distinct elements: a reflective surface 110 and a variable lens formed of two fluids 130, 140 of different refractive indices.

A fluid is a substance that alters its shape in response to any force, that tends to flow or to conform to the outline of its chamber, and that includes gases, liquids and mixtures of solids and liquids capable of flow.

The two fluids are substantially immiscible i.e. the two fluids do not mix. A lens function is thus provided by the meniscus 150 formed along the contact area between he two fluids, as the fluids have different refractive indices. A lens function is the ability of the meniscus 150 to focus (converge or diverge) one or more wavelengths of light.

The meniscus 150 extends transverse the optical axis 90 of the mirror 100. The term transverse indicates that the meniscus crosses (i.e. it extends across) the optical axis, and that it is not parallel to the optical axis; the meniscus may cross the optical axis 90 at any angle. The reflective surface 110 also extends across the optical axis 90, with the reflecting surface facing towards the meniscus. The fluids are enclosed within a chamber 125 defined by surfaces 120, 122[. At least the portions of the walls 120, 122 of the chamber 125 lying along the optical axis 90 are transparent. Typically, in order to locate the fluids within the desired portion of the chamber, different areas of the chamber will have different wettabilities for each fluid, such that each fluid will be attracted to a respective area. Wettability is the extent by which a side is wetted (covered) by a fluid. For instance, if the fluid 130 is a polar fluid, and the fluid 140 a non-polar fluid, then a transparent area 122 overlying the reflective surface 110 may be hydrophilic so as to attract the polar fluid 130, and not attract the non-polar fluid 140.

It will be appreciated that the mirror function provided by the adjustable lens 100 is the result of the lens function provided by the meniscus 150 and the reflective function provided by the reflective surface 110. In this particular embodiment the reflective surface is planar. In this particular example, the meniscus is convex (as viewed from the fluid 130), with fluid 130 having a higher refractive index than the fluid 140.

Consequently, then the resulting optical function provided by the adjustable mirror 100 is that of a concave mirror 190 as illustrated in FIG. 2B.

By adjusting either the position of the meniscus along the optical axis (i.e. the position of the meniscus relative to the reflective surface) or the shape of the meniscus, then the mirror function provided by the adjustable mirror can be changed. For instance, if the meniscus 150 is made more convex i.e. it takes the shape shown by dotted line 150', then the resulting mirror function will be that of a mirror having a smaller radius of curvature i.e. as indicated by the dotted line 190'.

A meniscus adjuster is used to alter at least one of the shape and the position of the meniscus 150. Various methods of displacing (changing the position or shape of) a volume of at least one of the fluids (and consequently the shape of the meniscus 150) are described, for example, within WO 02/069016.

Preferably, the meniscus shape is changed by utilising the electrowetting effect. In electrowetting, the three-phase contact angle is changed with applied voltage. The three-phases constitute two fluids and a solid. Typically, at least the first fluid is a liquid.

A variable focus lens utilising the electrowetting effect is described in international patent application WO 99/18456. In this arrangement, the lens comprises a chamber filled with a conductive first liquid, a droplet of an insulating, non-miscible second liquid being held in a surface zone of the chamber by a fluid contact layer applied around the wall. The fluid contact layer positions the droplet because a part of the fluid contact layer is hydrophobic and an adjacent part is hydrophilic. Application of a voltage to electrodes in the chamber causes the refracting upper surface or meniscus of the droplets to become more convex. In one embodiment, the hydrophobic and hydrophilic parts of the fluid contact layer are arranged along a cylindrical surface, the sides of the droplet being positioned axially along the cylindrical surface, and thereby centered by the hydrophilic part when no voltage is applied and by a series of electrodes along the sides of the cylinder when a voltage is supplied.

FIG. 3 illustrates an alternative, preferred variable focus lens 200 that utilises the electrowetting phenomenon to operate. Such a lens 200 could be used as the variable lens (120, 122, 130, 140, 150) illustrated in FIG. 2A to form an adjustable mirror 100.

The device 200 comprises a first fluid 220 and a second fluid 230, the two fluids being immiscible. The first fluid 220 is a non-conducting non-polar liquid, such as a silicone oil or an alkane. The second fluid 230 is a conducting or polar liquid such as water containing a salt solution (or a mixture of water and ethylene glycol).

The two fluids 220, 230 are preferably arranged to have an equal density, so as to minimise the gravitational effects between the two liquids such that the lens functions independently of orientation. The two fluids 220, 230 have different refractive indices, such that the interface 225 between the two fluids will act as a lens.

Varying the shape of the interface 225 will vary the focal length of the lens. The shape of the interface 225 is adjusted by the electrowetting phenomenon, by applying a voltage between the electrode 260 and the electrode 242 so as to alter the contact angle of the fluid and the walls of the device 200.

So as to allow the transmission of light through the device, at least opposite faces of the device (in the orientation shown in the figure, top and bottom surfaces) are transparent. In this particular embodiment, the device takes the form of a cylinder 210, with light entering and exiting through the transparent ends 212, 214 of the cylinder. The fluids 220, 230 are enclosed within the sealed space defined by the cylinder 210. One end 260 of the interior surface of the cylinder 210 is hydrophilic so as to attract the polar fluid 230. The remainder of the cylinder 210 (i.e. the opposite end, and the interior side walls) is coated with a hydrophobic coating 270.

The hydrophilic area 260 may be formed entirely of a hydrophilic material, or alternatively coated with a hydrophilic layer (e.g. silicon dioxide or glass).

In this particular embodiment, the hydrophilic area 260 of the interior surface is completely covered by a transparent hydrophilic conductor (e.g. Indium Tin Oxide), so as to form an electrode.

A voltage is supplied from variable voltage source 240 across the polar liquid 230 by the transparent electrode 260 and an annular electrode 242 extending around the device 200 in proximity to the three-phase line. Although the variable voltage source 240 is illustrated as a DC source, the voltage source may alternatively be an AC source. The electrode 242 is not in conductive contact with the polar fluid 230.

By arranging for one area of the interior surface of the cylinder to be hydrophilic, with the remainder of the interior surface being hydrophobic, then it will be appreciated that in this two fluid system the stability of the device will be greatly enhanced. The polar fluid will not adhere to any portion of the interior surface where it is desired to have only the non-polar fluid, and vice versa It should be noted that this condition does not prohibit the polar fluid 230 being in contact with part of the hydrophobic coating 270. The purpose of the hydrophilic layer is to locate the polar fluid i.e. to keep the polar fluid in a desired position (with the position often defining at least in part the shape). Thus, a relatively small hydrophilic area may be suitable for this purpose. For instance, the whole of the interior surface of a device could be hydrophobic, apart from those areas in which it is necessary to keep the polar fluid(s) in a certain shape or position.

Electrowetting can be used to increase the wettability of a polar or conducting fluid on a surface. If this wettability is initially small (for a polar liquid this is usually termed a hydrophobic surface, e.g. a Teflon-like surface), a voltage can be used to make it larger. If the wettability is initially large (for a polar liquid this is usually called a hydrophilic surface, e.g. silicon dioxide) then applying voltage will have relatively little effect. It is therefore preferable that in electrowetting devices the three-phase line is initially in contact with a hydrophobic layer.

Figure 4A:
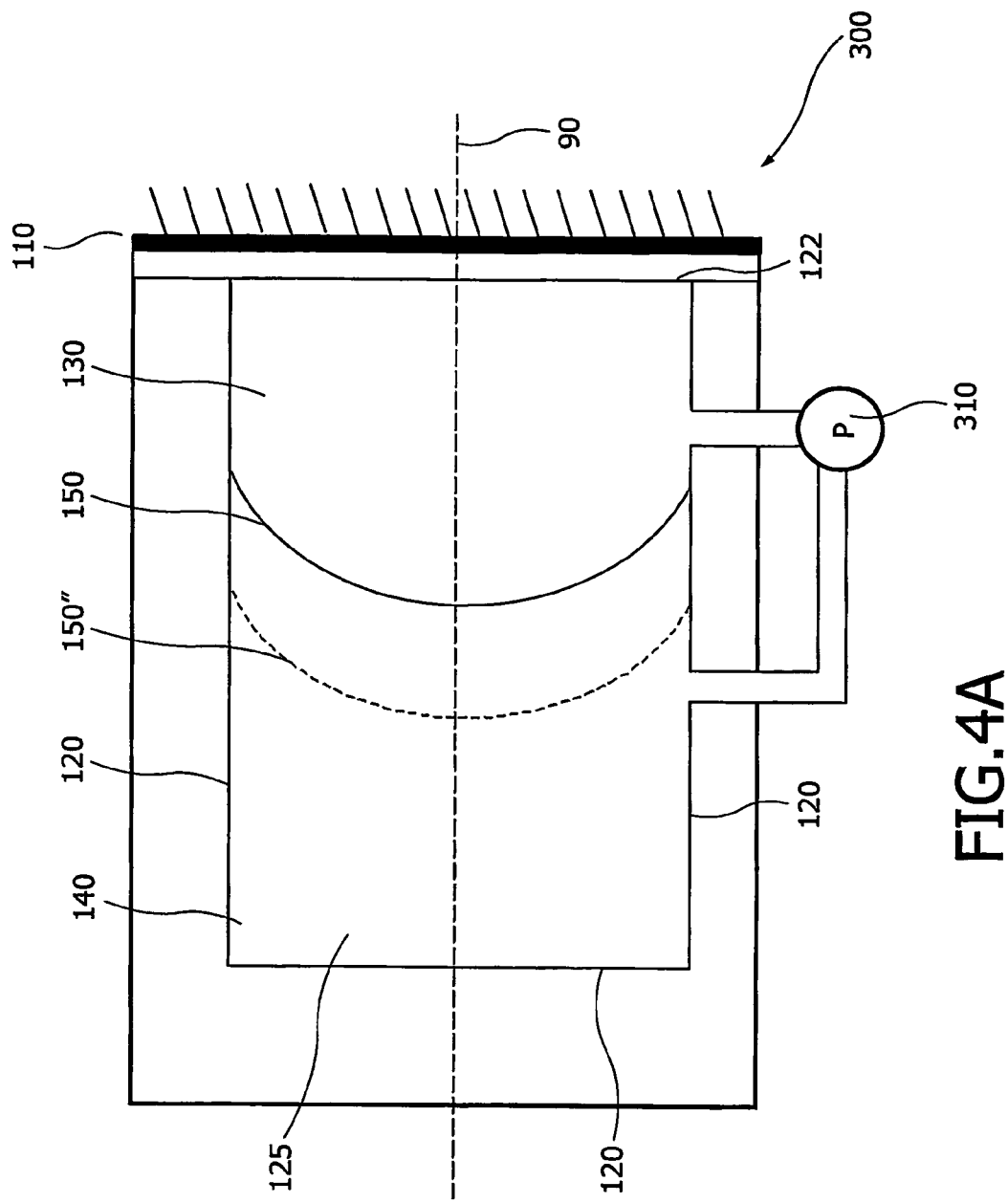

FIG. 4A illustrates a cross sectional schematic view of an adjustable mirror 300 in accordance with a second embodiment of the present invention. The mirror 300 is generally similar to the mirror 100 illustrated in FIG. 2A, with identical reference numerals being utilized to indicate similar components. In this particular embodiment, the adjustable mirror 300 further comprises a pump 310 connected to the fluid filled chamber 125 and arranged to pump quantities of one or more of the fluids to and from the chamber 125. In this particular example, the pump 310 is arranged to simultaneously increase the volume of the fluid 130 and decrease the volume of the fluid 140 (and vice versa), so as to maintain the same total volume of the two fluids 130, 140 within the chamber 125. The result will be that the meniscus 150 will be moved along the optical axis as fluids are added i.e. if extra fluid 130 is added, then the meniscus may move to position 150". In this particular embodiment, the shape of the meniscus is not altered, only its location along the optical axis.

Consequently, the result is that the shape of the equivalent mirror function provided by the meniscus and the reflective surface is not altered, but only the location of the mirror function along the optical axis, as indicated in FIG. 4B (390) represents the mirror function when the meniscus is at position 150, 390" represents the mirror function is at position 150".

Various types of pump may be used as the pump 310. For instance, international patent application WO 02/069016 describes a number of ways of how fluid can be moved e.g. electro-capillary differential-pressure electro-capillarity, electrowetting, continuous electrowetting, electrophoresis, electroosmosis, dielectrophoresis, electrohydrodynamic pumping, thermocapillary, thermal expansion, dielectric pump, or variable dielectric pumping, any of which could be used to provide the pump action required by the pump 310.

In alternative embodiments, the shape of the meniscus is varied as the meniscus position changes e.g. by varying the wettability of the walls running parallel to the optical axis, or by applying the electrowetting effect.

Figure 5A:
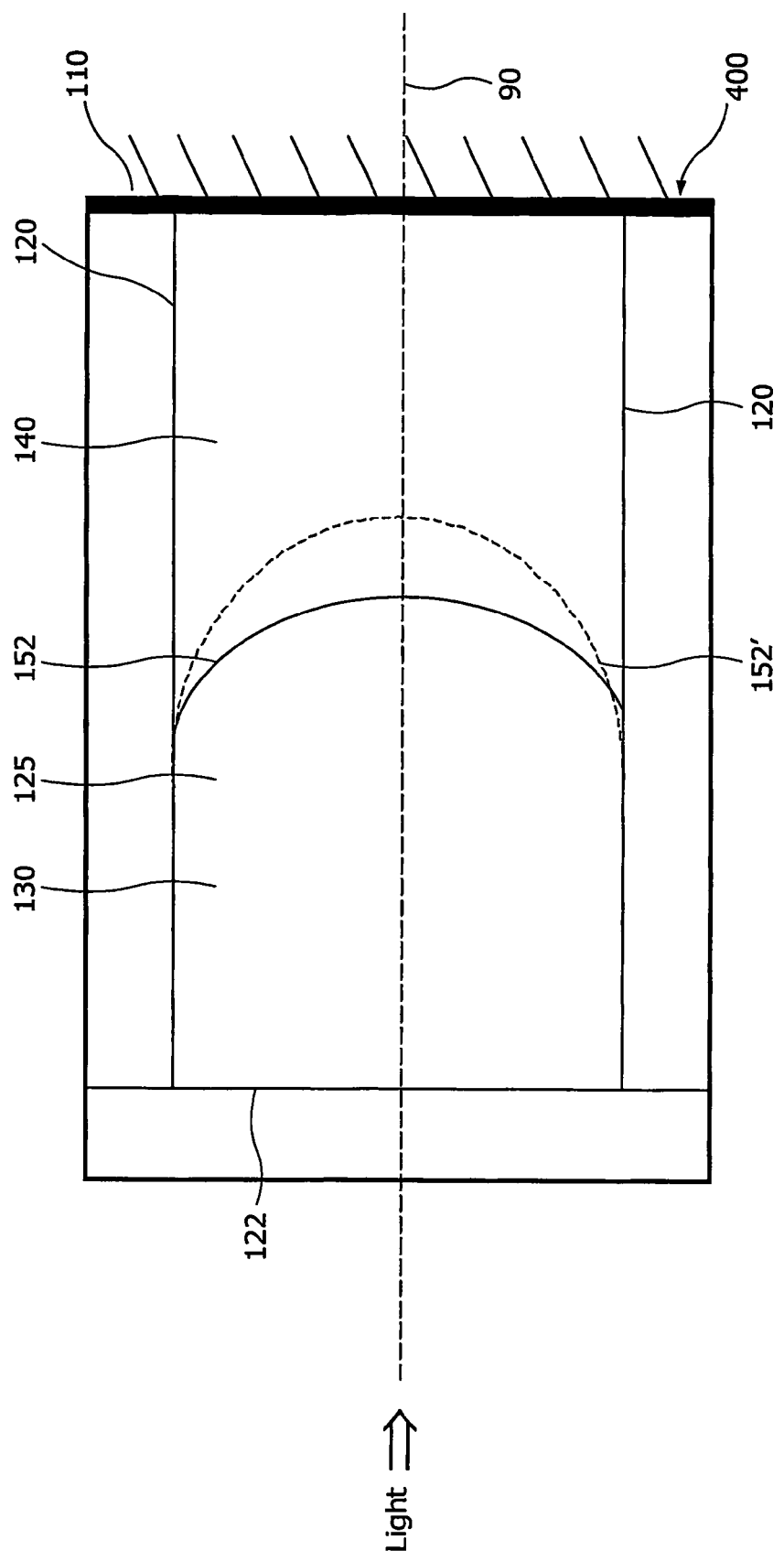
FIGS. 5A and 5B illustrate respectively a schematic cross section of an adjustable mirror and the equivalent optical function provided by the adjustable mirror in accordance with a third embodiment of the present invention.
Figure 5B:
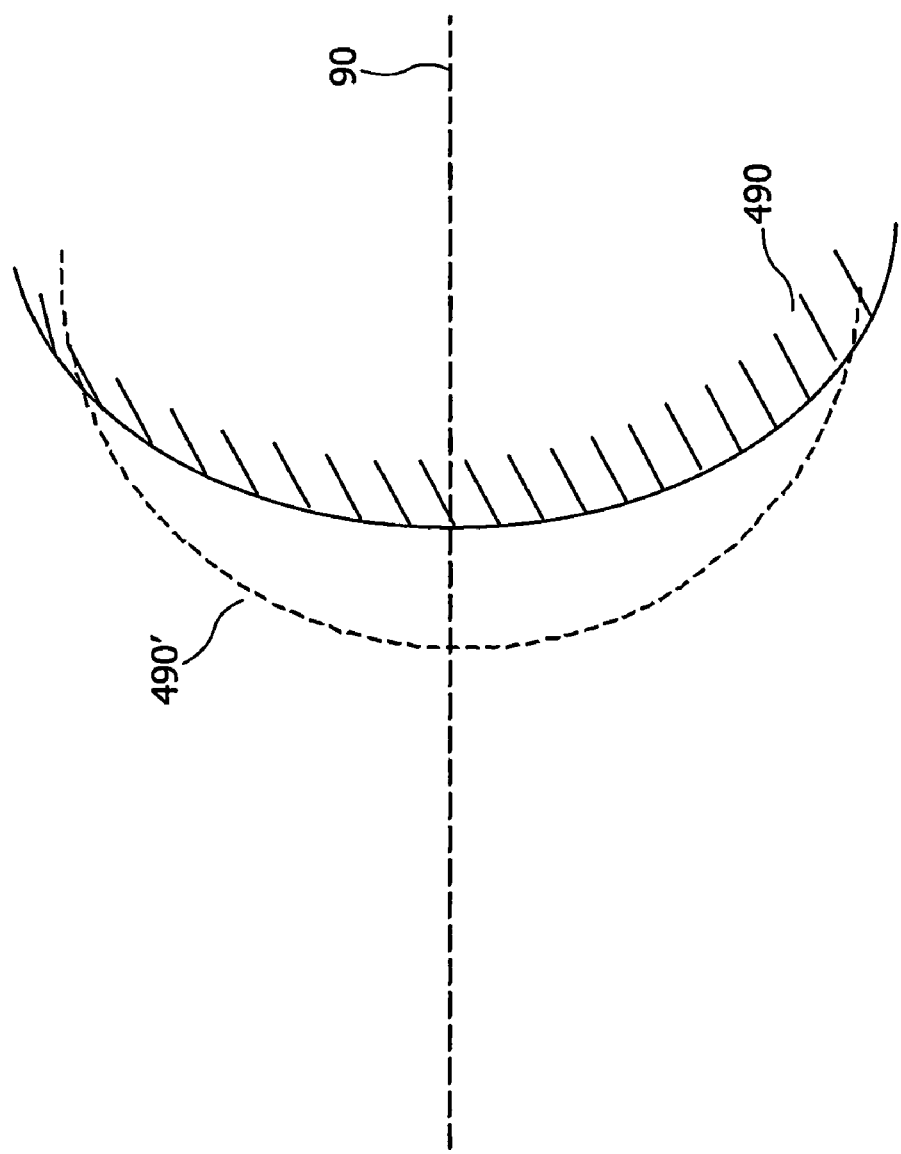

In the above embodiments, it has been seen that the fluid of higher refractive index 130 is adjacent to the reflective surface, and that the meniscus 150 is convex with respect to this fluid. However, it will be appreciated that either of the two fluids can have the higher refractive index, and that the meniscus can be concave or convex with respect to either fluid. For instance, FIG. 5A illustrates an adjustable mirror 400 in which the non-polar fluid 140 has a higher refractive index and is adjacent the reflective surface 110. In this instance, the fluid 130 is a polar fluid, and located via the hydrophilic surface 122 which forms the surface of the fluid chamber 120, 122 opposite the reflecting surface 110.

The result is that the meniscus 152 will act as a concave lens, with the resulting optical function provided by the meniscus and the reflective surface being that of a convex mirror 490. If the curvature of the meniscus is increased e.g. 152' then the curvature of the corresponding mirror function will correspondingly be decreased i.e. the mirror function will have a lower radius of curvature 490'.

It will be appreciated that the above embodiments are provided by way of example only, and that various alternatives will fall within the scope of the present invention. For instance, in the above embodiments, it has been assumed that a planar reflective surface is utilised. Such a flat reflective surface has the advantage that it is reflectively easy to form. However, it will be appreciated that the reflective surface could be of any shape e.g. concave, convex, paraboldoidal, or any desired aspherical shape. In the above embodiments, it has been assumed that the reflective surface is substantially perpendicular to the optical axis. However, it will be appreciated that the reflective surface can be at any desired angle to the optical axis, as long as the reflective surface is transverse (i.e. it crosses) the optical axis. For instance, the reflective surface could be a planar surface crossing the optical axis at a predetermined angle, or equally it could be a concave or convex surface inclined with respect to the optical axis.

In the above embodiments, the adjustable mirror has been shown as comprising a single variable optical device (e.g. a variable lens) formed by the meniscus between two fluids, and a single reflective surface. However, it will be appreciated that alternative embodiments can comprise a plurality of variable optical devices or a plurality of reflective surfaces. For instance, an adjustable mirror could be formed of a single (relatively large) reflective surface, with an array of variable optical devices (preferably each optical device corresponding to a different area of the reflective surface).

Equally, any other desired optical components can be incorporated within the adjustable mirror, such that the adjustable mirror provides the desired optical response. For instance, adjustable mirrors or gratings or further lenses could be incorporated within the adjustable mirror, depending upon the desired application of the mirror.

Figure 6A:
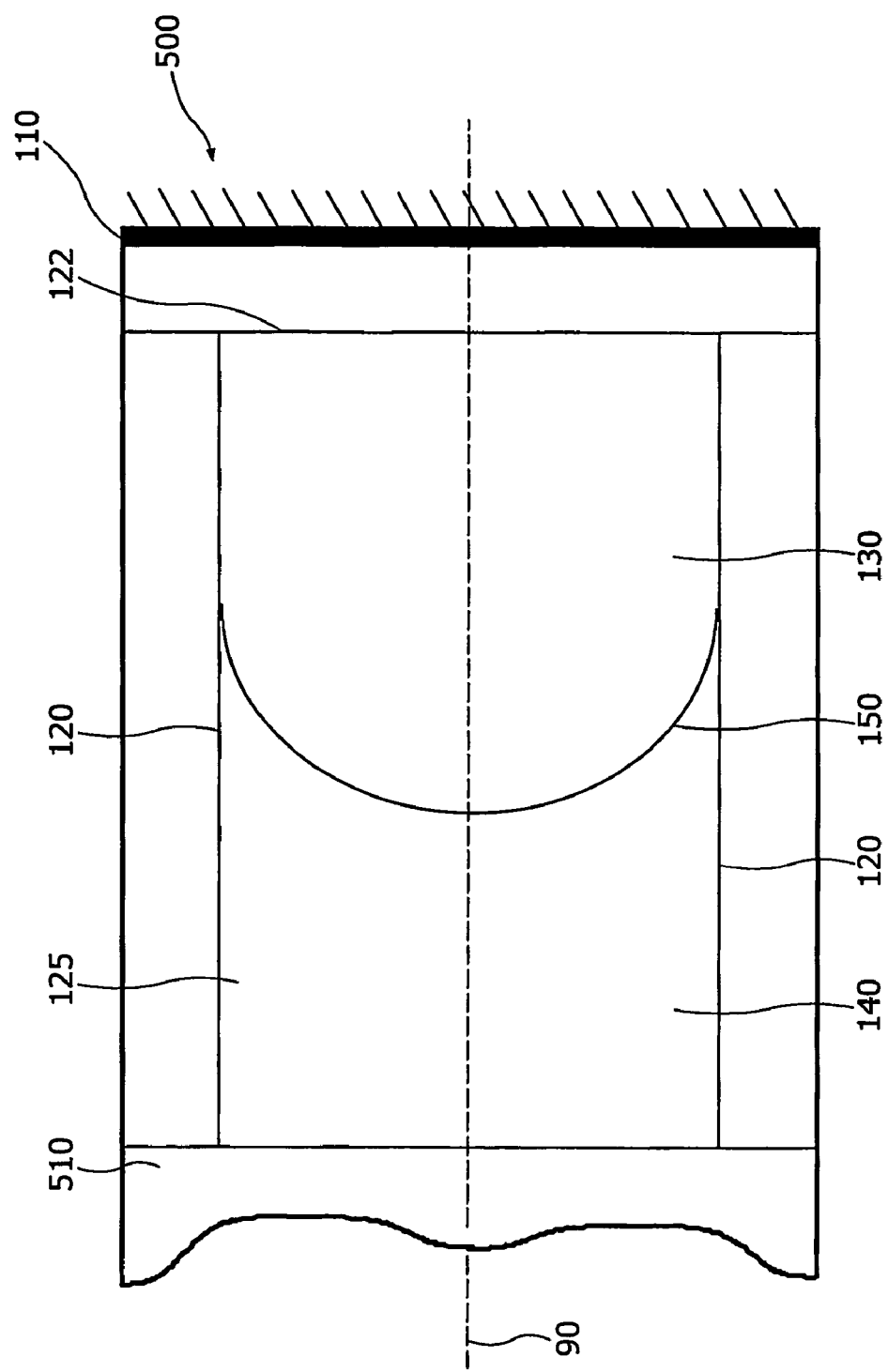
FIGS. 6A and 6B illustrate respectively a schematic cross section of an adjustable mirror and the equivalent optical function provided by the adjustable mirror in accordance with a fourth embodiment of the present invention.
Figure 6B:
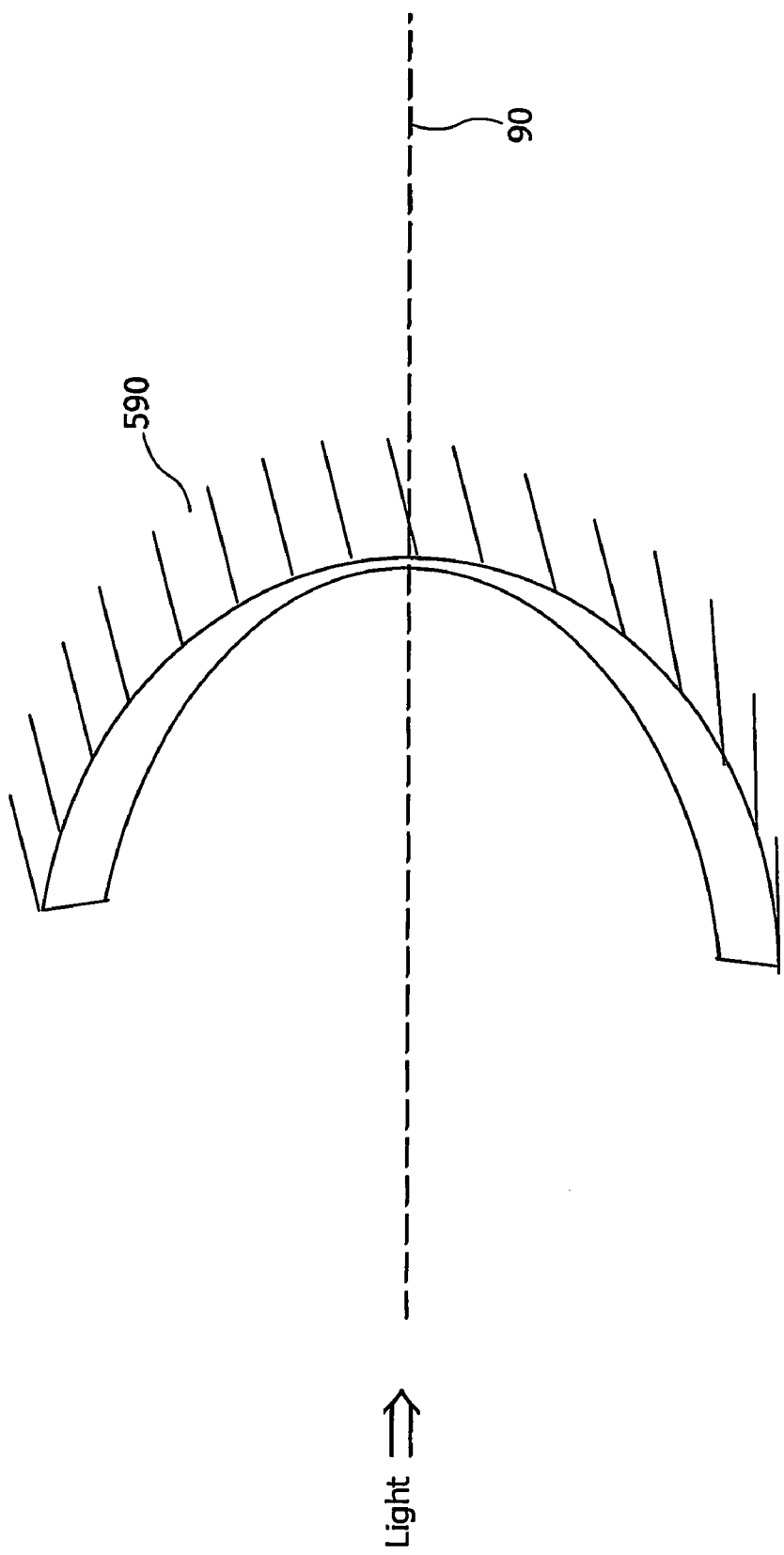

For instance, FIG. 6A illustrates an adjustable mirror 500 in accordance with a further embodiment of the present invention. An aspherical lens element 510 is provided within the optical path (e.g. extending substantially transverse the optical axis 90) so that the effective adjustable mirror 590 (FIG. 6B) formed is then of the Mangin type (as for instance described within the book by R. Kingslake, "Lens Design Fundamentals", Academic Press. This lens type consists of a reflective and a refractive part. The freedom in the choice of the material properties of the refractive part allows more design freedom.

In the above embodiments, the meniscus (the interface between the two fluids) has been indicated as being curved, and generally symmetrical with respect to the optical axis, and generally perpendicular to the optical axis at the point at which it crosses the optical axis. However, it will be appreciated that, depending upon the desired optical function to be performed by the meniscus, any or all of these conditions can be changed.

For instance, the meniscus can be substantially flat (i.e. planar). The shape of the meniscus can be non symmetrical with respect to the optical axis, and it can indeed be inclined at an angle to the optical axis. For instance, such effects can be achieved by using surfaces and/or electrode configurations that provide different electrowetting properties at different points around the circumference of the meniscus. Such different electrowetting properties will result in different parts of the circumference experiencing different contact angles with the relevant surfaces, hence changing the overall shape of the meniscus. Equally, it will be appreciated that different meniscus configurations can be achieved by utilising electrowetting and having one or more of the surfaces with which the meniscus contacts being non-parallel to the optical axis.

Figure 7:
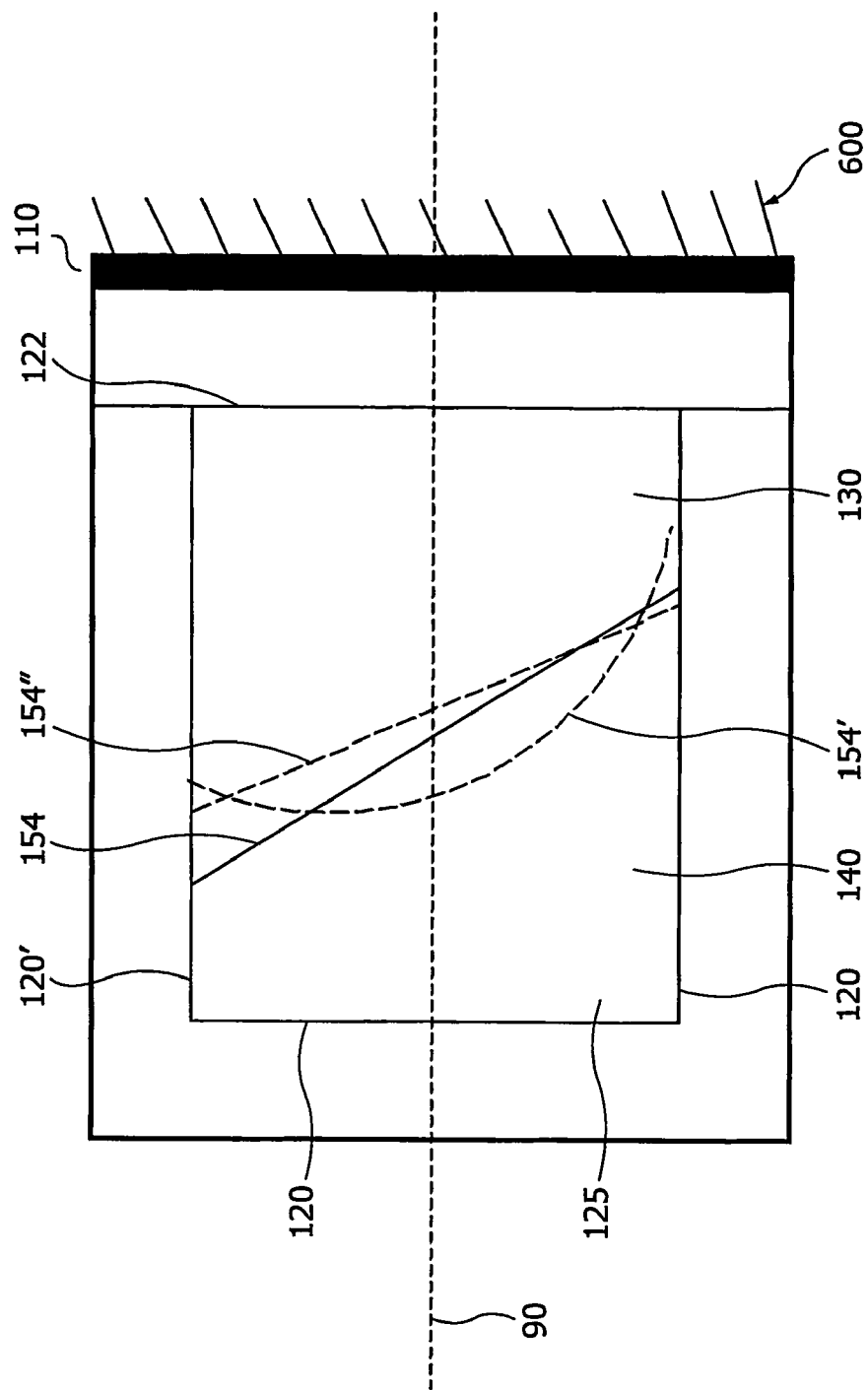
FIG. 7 illustrates a schematic cross section of an adjustable mirror in accordance with a fifth embodiment of the present invention.

FIG. 7 illustrates a simplified cross sectional view of an adjustable mirror 600 in accordance with another embodiment of the present invention. In this particular embodiment, the side wall 120 has a different wettability with respect to the two fluids than the side wall 120'. This difference in wettability can be due either to the intrinsic nature of the side walls (with the surfaces 120, 120' being formed of different materials) or by applying the electrowetting effect so as to change the wettability of one surface a greater amount than the other surface. If desired, each portion of the side wall contacting the circumference of the meniscus 154 can be arranged to have a different wettability.

By adjusting the wettability of the surface areas 120, 120' appropriately, the contact angles at which the meniscus contacts the surface can be altered, thus changing the shape of the meniscus. For instance, the meniscus 154 is shown as being essentially planar (at least with respect to the particular cross section taken), and at a particular angle with respect to the optical axis 90. If desired, by appropriately altering the wettability of the surfaces using the electrowetting effect and hence the contact angle of the meniscus with the surfaces 120, 120', then the angle of the planar meniscus 154 can be adjusted to a different angle with respect to the optical axis e.g. to form meniscus 154". Alternatively, by appropriate selection of contact angles, the shape of the meniscus can be adjusted, so as form a curved meniscus i.e. meniscus 154'. The net result would be that the meniscus shape or position is altered, so as to provide a different optical function. For instance, the planar meniscus 154 would act as refractive beam deflector, refractively deflecting the path of a beam incident upon the meniscus along the optical axis 90. By altering the position and/or orientation of the meniscus, a variety of optical functions can be realised, leading to a range of configurations of the adjustable mirror 600.

It will also be appreciated that the adjustable mirror described herein could be used in any optical device, for instance within an optical scanning device (as for instance described within U.S. Pat. No. 5,880,896) or in a lighting system using reflectors (in which case an additional light source would normally be provided) to provide adaptable reflectors e.g. for providing variable lighting levels within the reflector system for the head lamps of a vehicle.

Within lasers, a two-mirror resonator (also termed a resonant cavity) is commonly used. The mirrors can be planar, concave or convex. By fixing the curvature of the two mirrors and the length of the cavity, a well defined Gaussian resonator mode can be selected having the desired properties. By placing passive elements in the resonator the laser mode can be effected, as for instance described within C. Pare et al. IEEE J. Quantum Electron. 28 (1994) p 355, J. Leger et al, Opt. Lett. 19 (1994) p 108, J. Leger et al, Opt. Lett. 19 (1994) p 1976, S. Makid et al, IEEE J. Electron. 35 (1999) p 1075, J. Leger et al, ODF2000 proceedings p 89.

The present invention can be used to increase the design space of such resonators by actively altering the mode of the resonator. To alter the mode of the resonator, the curvature of at least one of the mirrors is adjusted. This can be achieved by using a mirror in accordance with the present invention.

Figure 8:
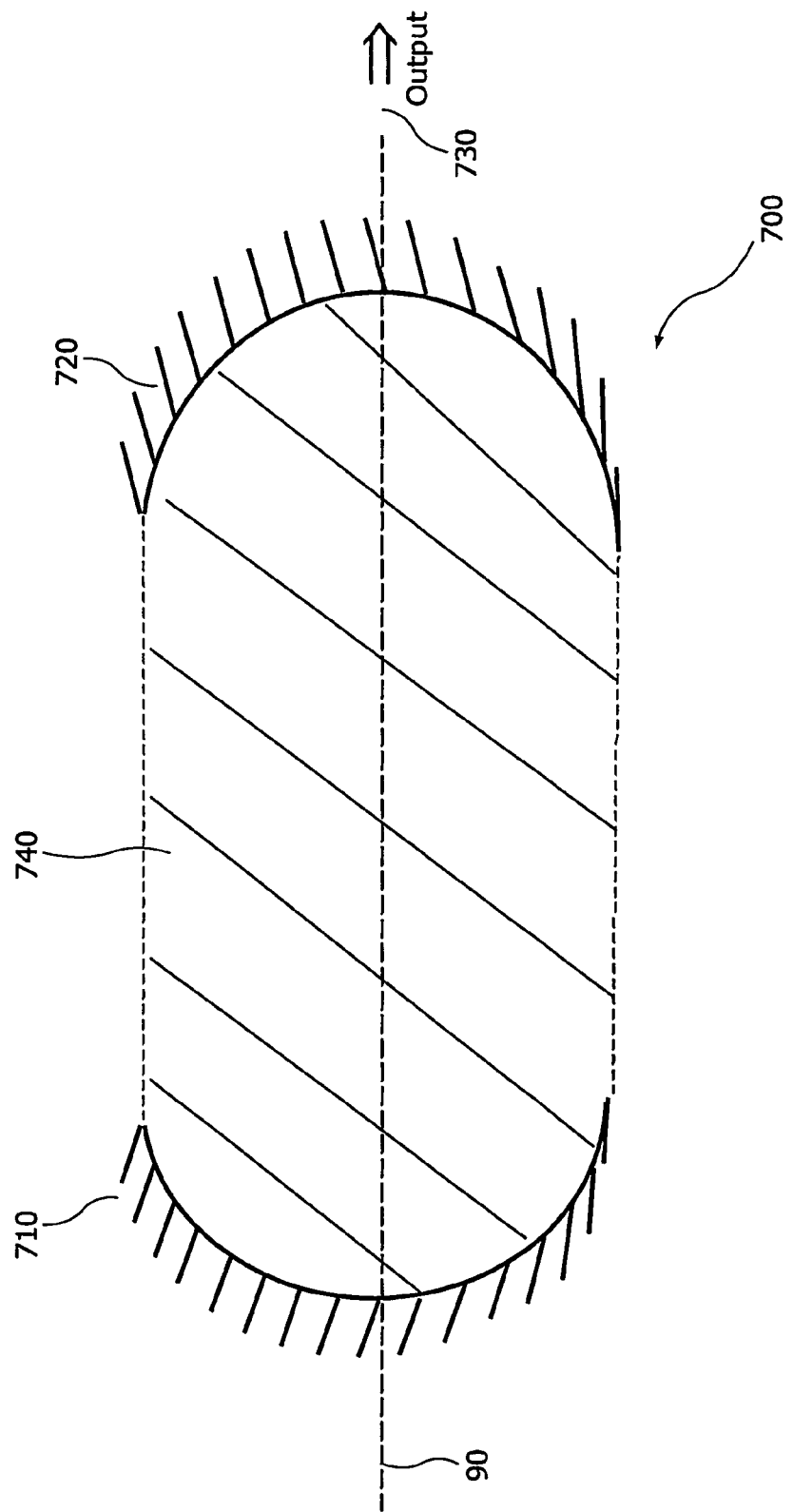
FIG. 8 shows a resonant cavity in accordance with a further embodiment of the present invention.

FIG. 8 illustrates a laser cavity 700 comprising first and second mirrors 710, 720. At least one of the mirrors 710, 720 is an adjustable mirror. In order to allow the output 730 of laser light, the mirror 720 is partially transmissive. A gain medium 740 typically lies between the two mirrors 710, 720. The curvature of one or more of the mirrors is adjusted to provide the desired optical mode. The effect of the curvature upon the mode has been described extensively in "Laser beams and resonators", H. Kogelnik and T. Li, Appl. Opt. 5, (1966) pp 1550-1567 and also in the book "Lasers", A. E. Siegman, University Science Books, Mill Valley, Calif. chapter 19. In Chapter 19.2, eight different resonator types are described: (1) symmetric resonators, (2) half-symmetric resonators, (3) symmetric confocal resonator, (4) long-radius (near-planar) resonators, (5) near-concentric resonators, (6) hemispherical resonators, (7) concave-convex resonators and (8) unstable confocal resonators. Each of these types has there own properties. By altering the curvature or position of the meniscus between the two fluids in an adjustable mirror, the cavity 600 can be switched between the desired resonance modes.

It will be appreciated that by providing an adjustable mirror comprising a variable optical device (e.g. a variable lens or variable beam deflector) formed by the meniscus between two fluids and a reflective surface, the present invention provides an adjustable mirror in which the optical path does not suffer from mechanical fatigue. Further, the device can be made cost effectively and it can be easily controlled.

The invention claimed is:

1. An adjustable mirror comprising:
   a first fluid and a second fluid in contact over a meniscus extending transverse an optical axis, the fluids being substantially immiscible and having different indices of refraction;
   a reflective surface extending transverse the optical axis; and
   a meniscus adjuster arranged to controllably alter at least one of the shape and the position of the meniscus by changing a first wettability of a first side wall of the adjustable mirror by a different amount than a second wettability of a second side wall of the adjustable mirror.

2. The adjustable mirror as claimed in claim 1, wherein said reflective surface is a substantially planar surface.

3. The adjustable mirror as claimed in claim 1, wherein said meniscus adjuster is arranged to utilize the electrowetting effect to alter the shape of the meniscus.

4. The adjustable mirror as claimed in claim 1, the mirror further comprising an aspherical lens element extending substantially transverse an optical axis.

5. The adjustable mirror of claim 4, wherein the meniscus adjuster is arranged to alter the at least one of the shape and the position of the meniscus to form an effective mirror having a reflective part and a refractive part.

6. The adjustable mirror of claim 1, wherein a first contact angle between the meniscus and a first side wall of the adjustable mirror is different than a second contact angle between the meniscus and a second side wall of the adjustable mirror.

7. The adjustable mirror of claim 1, wherein the optical axis extends through a center of the adjustable mirror.

8. An optical device comprising:
   a first fluid and a second fluid in contact over a meniscus extending transverse an optical axis, the fluids being substantially immiscible and having different indices of refraction;
   a reflective surface extending transverse the optical axis; and
   a meniscus adjuster arranged to controllably alter at least one of the shape and the position of the meniscus by changing a first wettability of a first side wall of the adjustable mirror by a different amount than a second wettability of a second side wall of the adjustable mirror.

9. The optical device as claimed in claim 8, wherein the device is a lighting system for providing a directed beam of light, the device further comprising a light source arranged to emit electromagnetic radiation.

10. The optical device as claimed in claim 8, wherein the optical device comprises a laser cavity, the cavity including a second mirror.

11. The optical device as claimed in claim 10, wherein said second mirror is also an adjustable mirror.

12. The optical device of claim 8, further comprising a reflector located at one of the optical device.

13. The optical device of claim 8, wherein a first contact angle between the meniscus and a first side wall of the adjustable mirror is different than a second contact angle between the meniscus and a second side wall of the adjustable mirror.

14. A method of manufacturing an adjustable mirror, the method comprising the acts of:
   providing a first fluid and a second fluid in contact over a meniscus extending substantially transverse an optical axis, the fluids being substantially immiscible and having different indices of refraction;
   providing a reflective surface extending transverse the optical axis; and
   providing a meniscus adjuster arranged to alter at least one of the shape and the position of the meniscus by changing a first wettability of a first side wall of the adjustable mirror by a different amount than a second wettability of a second side wall of the adjustable mirror.

15. The method of claim 14, wherein a first contact angle between the meniscus and a first side wall of the adjustable mirror is different than a second contact angle between the meniscus and a second side wall of the adjustable mirror.

16. A method of operating an optical device, the optical device comprising:
   a first fluid and a second fluid in contact over a meniscus extending transverse an optical axis, the fluids being substantially immiscible and having different indices of refraction; and
   a reflective surface extending transverse the optical axis;
   the method comprising controllably altering at least one of the shape and the position of the meniscus by changing a first wettability of a first side wall of the adjustable mirror by a different amount than a second wettability of a second side wall of the adjustable mirror.

17. A method of operating an optical device, the optical device comprising:
   a first fluid and a second fluid in contact over a meniscus extending transverse an optical axis, the fluids being substantially immiscible and having different indices of refraction; and
   a reflective surface extending transverse the optical axis;
   the method comprising the act of controllably altering at least one of a shape and a position of the meniscus by changing a first wettability of a first side wall of the optical device by a different amount than a second wettability of a second side wall of the optical device.

* * * * *